US012041385B2

(12) United States Patent
Tanaka et al.

(10) Patent No.: US 12,041,385 B2
(45) Date of Patent: Jul. 16, 2024

(54) IMAGE RECORDING SYSTEM, IMAGE RECORDING METHOD, AND RECORDING MEDIUM

(71) Applicant: OLYMPUS CORPORATION, Tokyo (JP)

(72) Inventors: Hiroshi Tanaka, Hachioji (JP); Yamato Kanda, Hino (JP); Makoto Kitamura, Hachioji (JP); Akihiro Kubota, Kokubunji (JP); Takao Tsuruoka, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/940,079

(22) Filed: Sep. 8, 2022

(65) Prior Publication Data

US 2023/0007213 A1   Jan. 5, 2023

Related U.S. Application Data

(63) Continuation of application No. PCT/JP2020/009910, filed on Mar. 9, 2020.

(51) Int. Cl.
*H04N 5/91* (2006.01)
*G06T 7/20* (2017.01)
(Continued)

(52) U.S. Cl.
CPC ............... *H04N 5/91* (2013.01); *G06T 7/20* (2013.01); *G06V 10/60* (2022.01); *G06V 10/774* (2022.01);
(Continued)

(58) Field of Classification Search
None
See application file for complete search history.

(56) References Cited

U.S. PATENT DOCUMENTS 10,803,582 B2   10/2020   Hosoi
2010/0281375 A1*  11/2010   Pendergast ............ G11B 27/34
                                                        715/723
(Continued)

FOREIGN PATENT DOCUMENTS

JP   2003271657 A   9/2003
JP   2007193592 A   8/2007
(Continued)

OTHER PUBLICATIONS

International Search Report dated Jun. 9, 2020 issued in PCT/JP2020/009910.

*Primary Examiner* — Eileen M Adams
(74) *Attorney, Agent, or Firm* — Scully, Scott, Murphy & Presser, P.C.

(57) ABSTRACT

An image recording system includes a processor. The processor acquires a time series RAW image group including a plurality of time series RAW images in a first time section. The processor extracts, from the time series RAW image group, a recording candidate RAW image group included in a second time section as a part of the first time section. The processor records at least one RAW image included in the recording candidate RAW image group as a recording target RAW image which is a RAW image to be recorded. The processor selects the recording target RAW image from the recording candidate RAW image group. The processor converts the RAW image which is not selected as the recording target RAW image from the recording candidate RAW image group or the time series RAW image group to compressed data, and records the compressed data.

13 Claims, 9 Drawing Sheets

(51) Int. Cl.
  *G06V 10/60* (2022.01)
  *G06V 10/774* (2022.01)
  *H04N 5/765* (2006.01)

(52) U.S. Cl.
  CPC ... *H04N 5/765* (2013.01); *G06T 2207/10068* (2013.01); *G06T 2207/30004* (2013.01); *G06V 2201/034* (2022.01)

(56) References Cited

U.S. PATENT DOCUMENTS

| | | |
|---|---|---|
| 2013/0215144 A1 | 8/2013 | Anzai et al. |
| 2016/0353969 A1* | 12/2016 | Kikuchi ................. A61B 34/20 |
| 2016/0379363 A1 | 12/2016 | Kitamura et al. |
| 2018/0000335 A1* | 1/2018 | Igarashi ................... H04N 9/64 |
| 2018/0152700 A1* | 5/2018 | Togita .................... H04N 19/63 |
| 2019/0197669 A1* | 6/2019 | Sakamoto ........... G06F 18/2185 |
| 2020/0065614 A1 | 2/2020 | Nishimura |

FOREIGN PATENT DOCUMENTS

| | | |
|---|---|---|
| JP | 2013171599 A | 9/2013 |
| JP | 2015173827 A | 10/2015 |
| JP | 2019117577 A | 7/2019 |
| WO | 2018008593 A1 | 1/2018 |
| WO | 2019064704 A1 | 4/2019 |

\* cited by examiner

IMAGE RECORDING SYSTEM, IMAGE RECORDING METHOD, AND RECORDING MEDIUM

CROSS REFERENCE TO RELATED APPLICATION

This application is a continuation of International Patent Application No. PCT/JP2020/009910, having an international filing date of Mar. 9, 2020, which designated the United States, the entirety of which is incorporated herein by reference.

BACKGROUND

Known is a technique of detecting a lesion from a medical image by image recognition with machine learning. PCT international publication No. WO2018/008593 discloses a technique of generating a neural network for identification of an abnormal region in an endoscopic image by machine learning using an image for learning in which a diagnosis subject is photographed and information indicating abnormality of the diagnosis subject and given to the image for learning in advance.

SUMMARY

In accordance with one of some aspect, there is provided an image recording system comprising a processor, the processor being configured to implement:
acquiring a time series RAW image group including a plurality of time series RAW images in a first time section;
extracting, from the time series RAW image group, a recording candidate RAW image group included in a second time section as a part of the first time section;
recording at least one RAW image included in the recording candidate RAW image group as a recording target RAW image which is a RAW image to be recorded, whereby selecting the recording target RAW image from the recording candidate RAW image group; and
converting the RAW image which is not selected as the recording target RAW image from the recording candidate RAW image group or the time series RAW image group to compressed data, and recording the compressed data.

In accordance with one of some aspect, there is provided an image recording method comprising:
acquiring a time series RAW image group including a plurality of time series RAW images in a first time section;
extracting, from the time series RAW image group, a recording candidate RAW image group included in a second time section as a part of the first time section;
selecting, from the recording candidate RAW image group, a recording target RAW image to be recorded;
recording at least one RAW image included in the recording candidate RAW image group as the recording target RAW image; and
converting the RAW image which is not selected as the recording target RAW image from the recording candidate RAW image group or the time series RAW image group to compressed data, and recording the compressed data.

In accordance with one of some aspect, there is provided a non-transitory computer-readable storage medium storing a program for causing a computer to execute:
acquiring a time series RAW image group including a plurality of time series RAW images in a first time section;
extracting, from the time series RAW image group, a recording candidate RAW image group included in a second time section as a part of the first time section;
selecting, from the recording candidate RAW image group, a recording target RAW image to be recorded;
recording at least one RAW image included in the recording candidate RAW image group as the recording target RAW image; and
converting the RAW image which is not selected as the recording target RAW image from the recording candidate RAW image group or the time series RAW image group to compressed data, and recording the compressed data.

DESCRIPTION OF EXEMPLARY EMBODIMENTS

Figure 1:
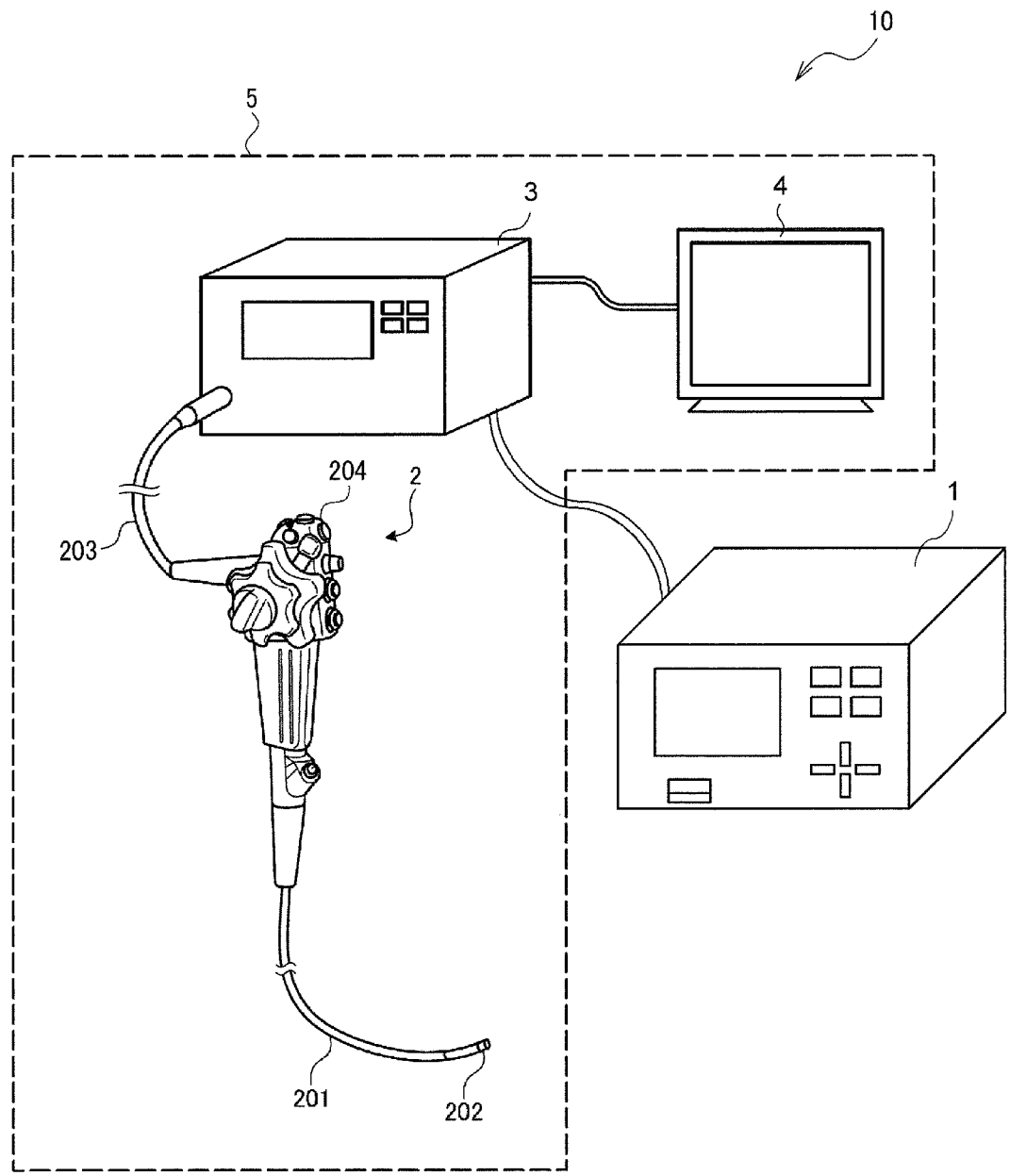
FIG. 1 illustrates an example configuration of an image capturing system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

1. Image Capturing System

FIG. 1 illustrates an example configuration of an image capturing system 10 which photographs and records a medical image. The image capturing system 10 includes an endoscope system 5 and an image recording system 1.

The endoscope system 5 is a system that photographs a medical image. The medical image is an inside body image photographed by a medical endoscope. The medical endoscope is a videoscope such as a digestive tract endoscope or the like, or a rigid scope for surgical procedures or the like.

FIG. 1 shows a videoscope as an example. The endoscope system 5 includes a scope 2, a control device 3, and a monitor 4.

The scope 2 photographs an inside of a subject body by inserting an elongated insertion section 201 to a body cavity of the subject, and outputs an image signal of the medical image that is an inside body image thereof. The scope 2 includes the insertion section 201, a grip section 204 disposed on a base end side of the insertion section 201, and a universal code 203 extending from the grip section 204. A connector is provided on a base end side of the universal code 203 and connected to the control device 3. An imaging module 202 is provided in a distal end section of the insertion section 201 and outputs an image signal of a RAW image as the image signal of the medical image. The imaging module 202 photographs a plurality of time series medical images by moving image photography or the like. In a case of moving image photography, each frame image of the moving image corresponds to each medical image.

The control device 3 controls the entire endoscope system 5, as well as performing signal processing on an image signal output from the imaging module 202, and outputs a processing result. Specifically, the control device 3 develops the RAW image to generate a color image, and displays the color image on the monitor 4. Further, the control device 3 outputs a plurality of RAW images photographed in time series to the image recording system 1. The image recording system 1 records some of a plurality of RAW images transmitted from the endoscope system 5 as an image for learning. Details of the image recording system 1 is described later. Note that while in FIG. 1, the image recording system 1 is an external system of the control device 3, the image recording system 1 may be integrated with the control device 3.

The RAW image is an image before being developed to be a color image, having a pixel value corresponding to each pixel of an image sensor recorded as it is. For example, if the image sensor is a primary color Bayer-type sensor, R, G, and B pixels are arranged in the image sensor and the RAW image has one pixel value per pixel recorded as it is regardless of a pixel color thereof. The color image is an image obtained by interpolation and compression of the RAW image according to a Bayer-type layout, and has RGB pixel values per pixel. Since the RAW image is unprocessed and uncompressed data, data amount per image is larger than the color image.

Image processing has been applied to the medical image according to a default setting or a user setting of a medical equipment. Therefore, a trained model obtained by machine learning is affected by the setting contents of the medical equipment at the time of generating the medical image to be used as the image for learning. Thus, considered is a method of acquiring the RAW image as the image for learning, which is an unprocessed original signal from the image sensor. However, when using the RAW image as the image for learning, there is a problem that the data amount of the accumulated RAW images becomes extremely large.

More specifically, image processing suitable for endoscopic observation has been applied to the color image. Since this image processing is not necessarily suitable for machine learning, when using the color image as the image for learning, machine learning will be affected by the image processing already applied to the color image. On the other hand, the RAW image is an undeveloped image and thus characterized by high flexibility for image processing. Therefore, by accumulating the RAW images as the image for learning, it is possible to use the RAW images in machine learning after processing them to the ones suitable for machine learning. This is expected to improve the accuracy of image recognition. For the above reasons, there is a strong need to acquire the RAW images as learning data for image recognition with machine learning, but there is a problem that the data amount of the RAW images is extremely large.

2. First Example Configuration of Image Recording System

Figure 2:
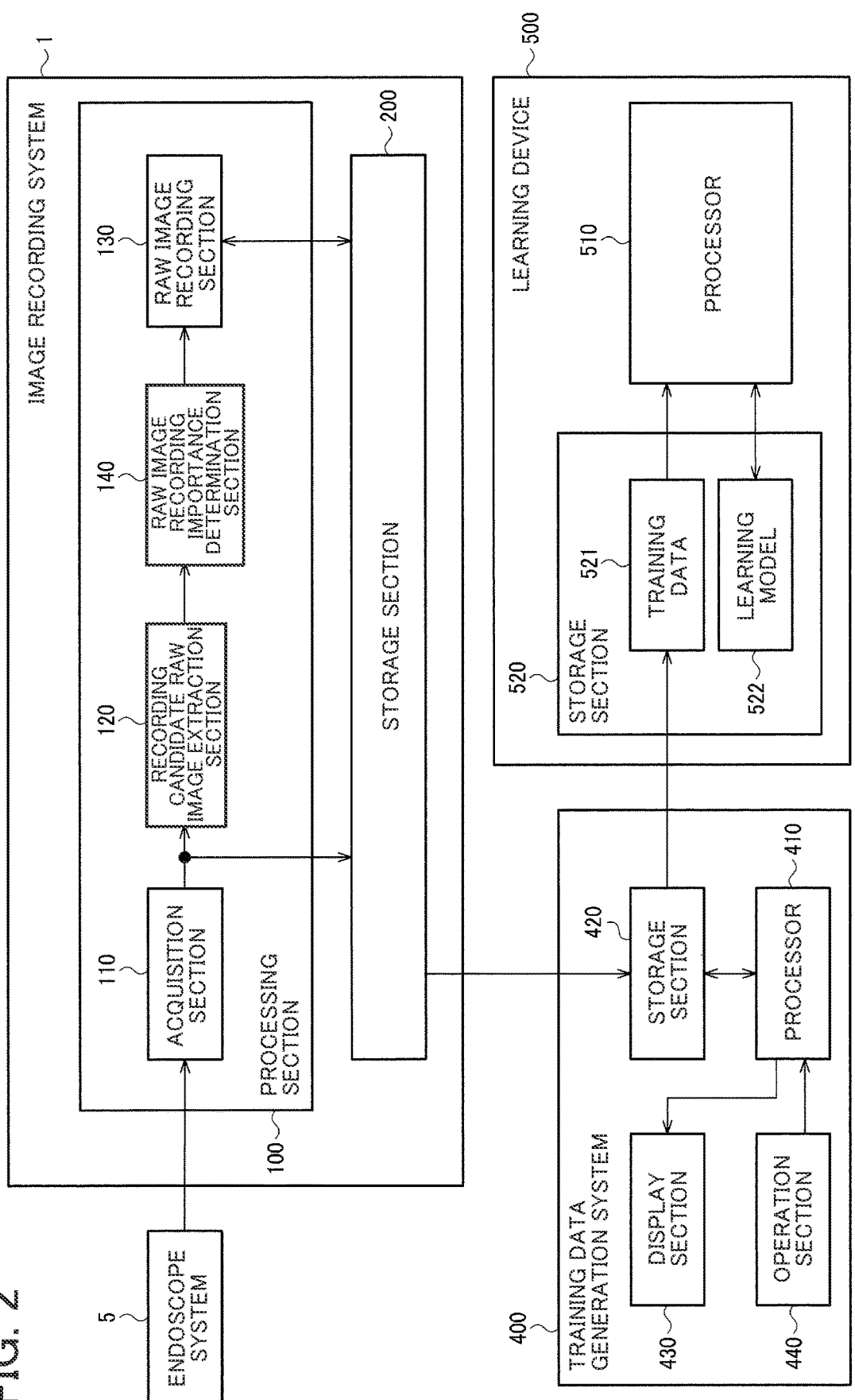
FIG. 2 illustrates a first example configuration of an image recording system.

FIG. 2 illustrates a first example configuration of the image recording system 1. While FIG. 2 also illustrates a training data generation system 400 and a learning device 500, the training data generation system 400 and the learning device 500 are not necessarily connected to the image recording system 1 when the image recording system 1 records an image.

Figure 3:
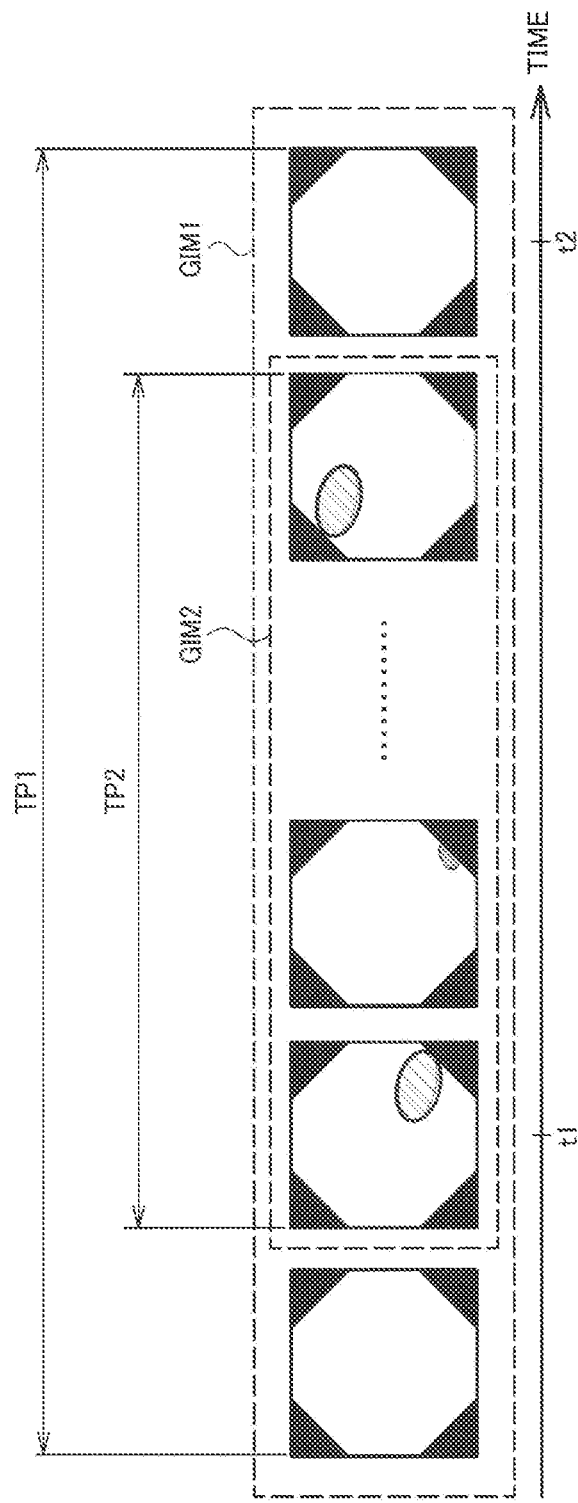
FIG. 3 is a diagram illustrating processing performed by a processing section in the first example configuration.

The image recording system 1 includes an acquisition section 110, a recording candidate RAW image group extraction section 120, and a RAW image recording section 130. As illustrated in FIG. 3, the acquisition section 110 acquires a time series RAW image group GIM1 including a plurality of time series RAW images in a first time section TP1. The recording candidate RAW image group extraction section 120 extracts, from the time series RAW image group GIM1, a recording candidate RAW image group GIM2 included in a second time section TP2 as a part of the first time section TP1. The RAW image recording section 130 records at least one RAW image included in the recording candidate RAW image group GIM2 as a recording target RAW image which is a RAW image to be recorded.

As a result, in some embodiments, only a part of the RAW images in the time series RAW image group GIM1 acquired by the acquisition section 110 are recorded, and thus it is possible to reduce the recording data amount compared to a case of recording the entire time series RAW image group GIM1. Thereby, it is possible to achieve both reduction of the recording data amount of the image for learning and acquisition of the RAW image as the image for learning. Furthermore, as a result, in some embodiments, the recording candidate RAW image group GIM2 included in the second time section TP2 is extracted. Thereby, a plurality of RAW images in a certain time span becomes a recording candidate such that the RAW image suitable for machine learning can be recorded, compared to a method of recording only one RAW image at a prescribed timing.

A detailed description of the first example configuration will be given below. The image recording system 1 includes a processing section 100 and a storage section 200. The processing section 100 includes the acquisition section 110, the recording candidate RAW image group extraction section 120, the RAW image recording section 130, and a RAW image recording importance determination section 140.

The image recording system 1 is, for example, an information processing device such as a personal computer (PC). Alternatively, the image recording system 1 may be a system in which a terminal device and an information processing device are connected through network. For example, the terminal device may include the storage section 200 and the information processing device may include the processing section 100. Alternatively, the image recording system 1 may be a cloud system in which a plurality of information processing devices is connected through network.

The storage section 200 stores the time series RAW image group GIM1 acquired by the acquisition section 110. The storage section 200 is a storage device such as a semiconductor memory or a hard disk drive. The semiconductor memory is, for example, a volatile memory such as RAM or a non-volatile memory such as EEPROM.

The processing section 100 is a processor. The processor may be an integrated circuit device such as a CPU, a microcomputer, a DSP, an application specific integrated circuit (ASIC), or a field programmable gate array (FPGA). The processing section 100 may include one or more processors. Further, the processing section 100 that is a processor may be, for example, a processing circuit or a processing device including one or more circuit components, or may be a circuit device with one or more circuit components mounted on a board.

Operation of the processing section 100 may be realized by software processing. That is, a program is stored in the storage section 200, the program describing all or part of the operation of the acquisition section 110, the recording candidate RAW image group extraction section 120, the RAW image recording section 130, and the RAW image recording importance determination section 140 which are included in the processing section 100. The processor executes the program stored in the storage section 200 to realize the operation of the processing section 100. The program may be stored in a computer readable information storage medium. The information storage medium can be implemented by, for example, an optical disk, a memory card, an HDD, or a semiconductor memory. The computer is a device equipped with an input device, a processing section, a storage section, and an output section.

Figure 4:
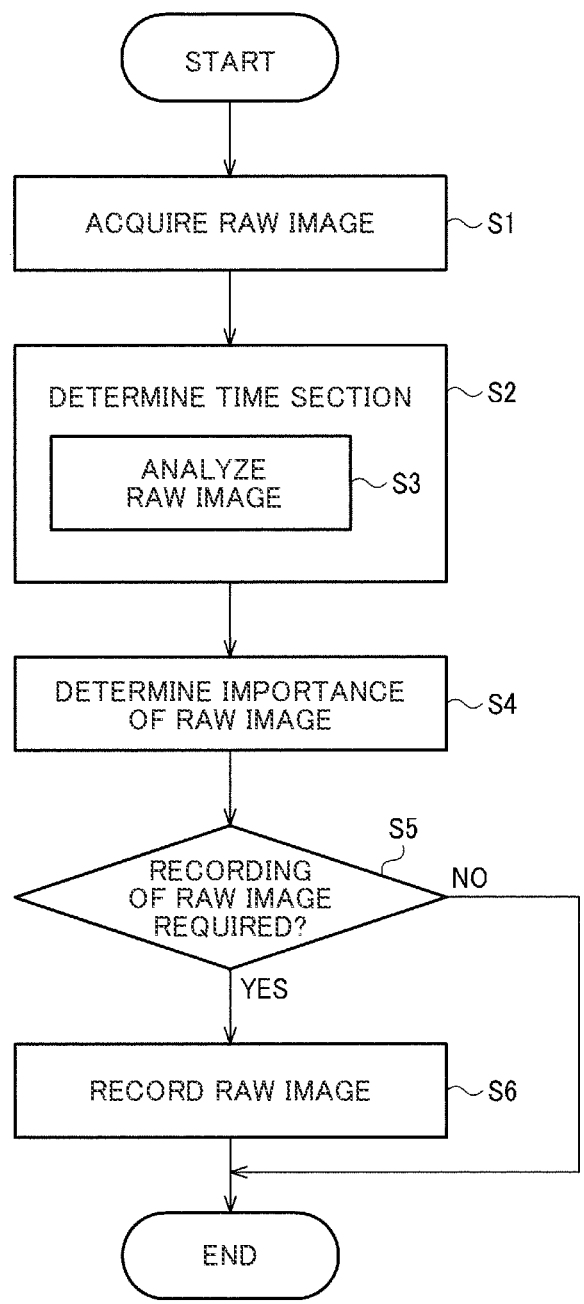
FIG. 4 is a flowchart illustrating processing performed by the processing section in the first example configuration.

FIG. 4 is a flowchart illustrating processing performed by the processing section 100 in the first example configuration. In a step S1, the acquisition section 110 acquires the RAW images. Specifically, the acquisition section 110 is a data interface of the processing section 100 and receives the time series RAW image group GIM1 transferred from the endoscope system 5 and temporarily stores the time series RAW image group GIM1 in the storage section 200. Alternatively, the time series RAW image group GIM1 transferred from the endoscope system 5 may be temporarily stored in the storage section 200 and read out from the storage section 200 by the acquisition section 110.

As illustrated in FIG. 3, the time series RAW image group GIM1 is a plurality of RAW images captured in time series in the first time section TP1. The first time section TP1 may be an arbitrary time section. For example, in a case where the endoscope system 5 photographs a moving image and the acquisition section 110 acquires the moving image to store it in the storage section 200, photographing time of one moving image corresponds to the first time section TP1. Alternatively, when the recording candidate RAW image group extraction section 120 extracts the recording candidate RAW image group GIM2, a time section processed by single extraction processing corresponds to the first time section TP1.

In a step S2, the recording candidate RAW image group extraction section 120 determines the second time section TP2. Specifically, the recording candidate RAW image group extraction section 120 analyzes the RAW images included in the time series RAW image group GIM1 in a step S3, and determines the second time section TP2 in the step 2 based on the analysis result.

Figure 5:
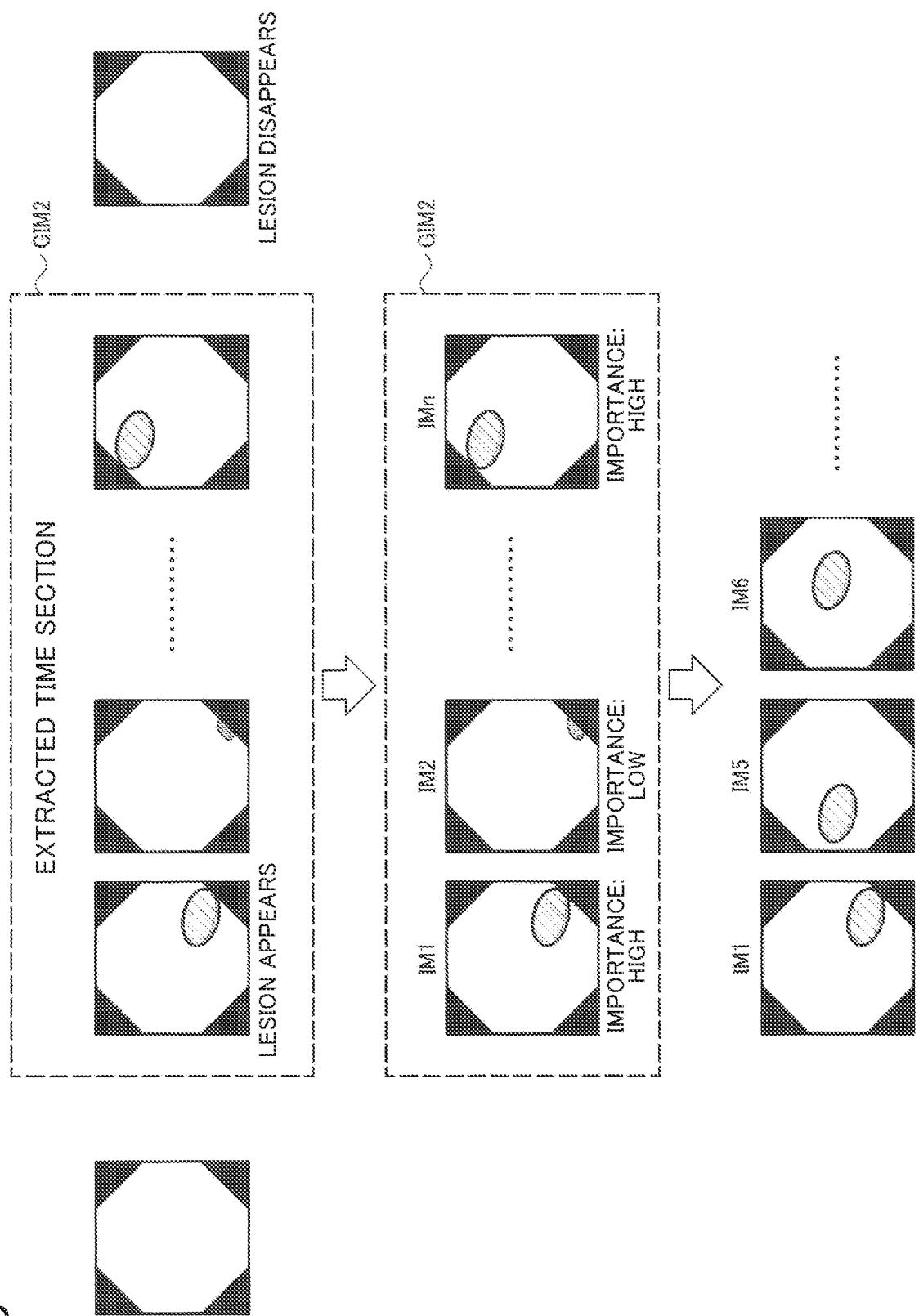
FIG. 5 is a diagram illustrating processing performed by the processing section in the first example configuration.

FIG. 5 is a diagram illustrating processing performed by the processing section 100. FIG. 5 illustrates an example in which the recording candidate RAW image group extraction section 120 detects a lesion from the RAW images. The "extracted time section" in FIG. 5 corresponds to the second time section TP2 in FIG. 3, and a section from a time t1 at which the lesion appears to a time t2 at which the lesion disappears is the second time section TP2. That is, the time section in which the lesion is captured in the RAW images is the second time section.

For example, the recording candidate RAW image group extraction section 120 detects appearance and disappearance of a lesion by analyzing the time series RAW images. In this case, the time t1 as a start point and the time t2 as an end point are decided, and the interval therebetween becomes the second time section TP2. Alternatively, the recording candidate RAW image group extraction section 120 determines whether or not the lesion is captured in each RAW image by analyzing the RAW images included in the time series RAW image group GIM1 one by one. In this case, a time section corresponding to the RAW images, which are determined that the lesion is captured therein, results in the second time section TP2.

While the description has been given of the example in which analysis of the RAW images corresponds to lesion detection, the analysis method is not limited thereto. Other examples of the analysis method are described later. Further, the second time section TP2 may be determined based on system information of the endoscope system 5. A description of this example will be given with regard to the second example configuration.

In a step S4 in FIG. 4, the RAW image recording importance determination section 140 determines importance of the RAW image. The importance is, for example, importance in machine learning using the RAW image. The importance indicates, for example, whether a target for image recognition with machine learning is captured or not, or whether a target for image recognition is captured in a manner contributing to highly accurate learning.

As illustrated in FIG. 5, the RAW images included in the recording candidate RAW image group GIM2 are designated as IM1 to IMn. n is an integer greater than or equal to 2. The RAW image recording importance determination section 140 determines each importance of IM1 to IMn RAW images. In the example of FIG. 5, the importance has two levels of "high" and "low", and each RAW image is determined to have either "high" or "low" importance. The RAW image recording importance determination section 140 determines the importance based on, for example, whether an entire lesion is captured in the RAW image or not, or the ratio of the lesion region to the RAW image. Note that the importance determination method is not limited to the above. Other determination methods are described later.

The RAW image recording importance determination section 140 outputs the recording target RAW image, which is the RAW image determined to be of high importance, i.e. importance "high". FIG. 5 illustrates an example in which IM1, IM5, IM6, . . . , are determined to be recording target RAW images. The importance may be classified in three or more levels, or may be continuous values. In this case, the RAW image recording importance determination section 140 outputs the RAW image with importance higher than a threshold value as the recording target RAW image.

In a step S5 in FIG. 4, the RAW image recording section 130 determines whether recording of the RAW image is required or not. That is, the RAW image recording section 130 determines that recording of the RAW image is not required when there are no RAW images determined to be the recording target RAW image in the step S4, and ends the processing in the flowchart. The RAW image recording section 130 determines that recording of the RAW image is required when there is the RAW image determined to be the recording target RAW image in the step S4, and records the recording target RAW image in the storage section 200.

For example, the RAW image recording section 130 deletes the RAW image other than the recording target RAW image among the time series RAW image group GIM1 temporarily stored in the storage section 200, thereby recording the recording target RAW image in the storage section 200. Alternatively, the RAW image recording section 130 may delete the time series RAW image group GIM1 temporarily stored in the storage section 200, and newly store the recording target RAW image in the storage section 200.

The training data generation system 400 includes a processor 410, a storage section 420, a display section 430, and an operation section 440. The RAW image recorded in the storage section 200 of the image recording system 1 is transmitted to the training data generation system 400 and stored in the storage section 420.

The processor 410 reads out the RAW image from the storage section 420, develops the RAW image to generate a display image, and displays the display image on the display section 430. The processor 410 includes a training label acquisition section and a training label recording section. A user inputs the training label corresponding to the display image by using the operation section 440. The training label acquisition section acquires the input training label. The training label recording section associates the training label with the RAW image so as to be a training image, and records the training image in the storage section 420.

The learning device 500 includes a storage section 520 and a processor 510. The training image stored in the storage section 420 of the training data generation system 400 is transmitted to the learning device 500 and stored in the storage section 520 as training data 521.

The storage section 520 stores a learning model 522 for machine learning. The processor 510 performs machine learning for the learning model 522 using the training data 521. The learning model 522 subjected to machine learning is transferred to the endoscope system as a trained model and used for image recognition in the endoscope system.

In the above embodiments, the recording target RAW image is to be used in machine learning together with the training label which is associated with the recording target RAW image so as to be the training image.

As a result, in some embodiments, the image recording system 1 records the RAW image which is then used in machine learning, such that the accuracy of machine learning can be improved. The image recording system 1 selects the RAW image to be recorded, such that both reduction of the data amount of the training image and improvement of accuracy of machine learning can be achieved.

As a method for reducing data amount of the RAW image to be recorded, for example, a method is also considered in which the RAW image only at a scene switching timing or at a shutter operation timing is recorded. However, by such method, the RAW image only at a certain timing is to be recorded. Therefore, there may be a case where no RAW images suitable for machine learning are recorded, or there is a problem that the RAW image before or after the timing is not recorded.

In the present embodiment, the image recording system 1 has the RAW image recording importance determination section 140 that selects the recording target RAW image from the recording candidate RAW image group GIM2. The RAW image recording section 130 records the recording target RAW image selected by the RAW image recording importance determination section 140. Specifically, the RAW image recording importance determination section 140 determines each RAW image in the recording candidate RAW image group GIM2 based on the importance, whereby selecting the recording target RAW image.

The recording candidate RAW image group GIM2 is thus extracted and among them, the RAW image with high importance is recorded such that the RAW image appropriate for machine learning is recorded. Furthermore, the recording candidate RAW image group GIM2 included in the second time section TP2 is extracted, whereby allowing to record a plurality of RAW images containing information on time series changes. This makes it possible to generate, for example, an image recognition system that even takes into consideration the time series changes in images, by machine learning.

Further in the present embodiment, the processing time for one RAW image performed by the RAW image recording importance determination section 140 is longer than the processing time for one RAW image performed by the recording candidate RAW image group extraction section 120. Specifically, the processing time for determining importance of one RAW image by the RAW image recording importance determination section 140 is longer than the processing time for determining whether one RAW image is to be the recording candidate or not by the recording candidate RAW image group extraction section 120.

In this way, since the recording candidate RAW image group GIM2 is extracted from the time series RAW image group GIM1 by processing with a small processing load, importance determination targets requiring a large processing load are reduced. Accordingly, a processing load in the entire process of selecting the recording target RAW image can be reduced.

The processing with a small processing load to be performed by the recording candidate RAW image group extraction section 120 is assumed to be determination based on a recognition result input by an external image recognition system, for example. The image recognition includes, for example, detection of a lesion, abnormal mucosa, or an organ. Alternatively, the processing with a small processing load is assumed to be determination based on parameters such as brightness of an image calculated with a relatively small load. Alternatively, the processing with a small processing load is assumed to be determination based on the system information input from the endoscope system 5, as described with regard to the second example configuration. The system information includes a type of illumination light, treatment information, information on user operation, or the like.

The processing with a large processing load to be performed by the RAW image recording importance determination section 140 is assumed to be the importance determination based on image recognition performed by the RAW image recording importance determination section 140 itself, for example. The image recognition includes, for example, analysis of a type or size of a lesion and a treatment condition.

Further in the present embodiment, the acquisition section 110 acquires, as a plurality of RAW images, a plurality of medical images photographed in time series by the endoscope system 5.

In machine learning using medical images, it is assumed that a variety of image extension would be applied to the medical images depending on the image recognition target. That is, there are various image recognition targets such as targets characterized by uneven structures, blood running, color, or texture, and image extension is applied depending on such characteristics. To allow such a variety of image extension, it is preferable to accumulate RAW images flexibly enduring image processing. As a result, in some embodiments, it is possible to accumulate the RAW images while reducing the amount of recording data, and use them in machine learning of the medical images.

3. Various Embodiments of First Example Configuration

A description will be given of a specific example of a method in which the recording candidate RAW image group extraction section 120 extracts the recording candidate RAW image group GIM2. Any one of the following methods may be adopted, or two or more methods may be combined.

In a first method, the recording candidate RAW image group extraction section 120 detects a state of an image capturing target in the RAW image included in the time series RAW image group GIM1, and based on the state of the image capturing target, extracts the recording candidate RAW image group GIM2. For example, the following first to third examples can be assumed.

In the first example, the recording candidate RAW image group extraction section 120 detects a lesion from appearance to disappearance thereof in the time series RAW image group GIM1, and sets the section from appearance to disappearance thereof to the second time section TP2. The appearance and disappearance of the lesion is, for example, detected by image recognition processing such as AI processing. The lesion is a pathologically changed tissue, such as, for example, a polyp or cancer.

In the second example, the recording candidate RAW image group extraction section 120 detects abnormal mucosa from its appearance to disappearance in the time series RAW image group GIM1, and sets the section from appearance to disappearance thereof to the second time section TP2. The appearance and disappearance of the abnormal mucosa is, for example, detected by image recognition processing such as AI processing. The abnormal mucosa is mucosa that is not normal, for example, mucosa with inflammation, bleeding, or atrophy.

In the third example, the recording candidate RAW image group extraction section 120 determines an organ captured in the time series RAW image group GIM1, and set the time section in which the organ to be subjected to machine learning is captured to the second time section TP2. The organ is, for example, detected by image recognition processing such as AI processing.

As a result, in some embodiments, it is possible to roughly extract the candidate RAW image according to the state of the image capturing target before selecting the RAW image based on the importance. That is, it is possible to exclude the RAW image in which no image recognition target for machine learning is captured or the RAW image in which the image capturing target is captured in a state unsuitable for machine learning, and record the other RAW image as a candidate.

In a second method, the recording candidate RAW image group extraction section 120 detects directly or indirectly brightness of the RAW image included in the time series RAW image group GIM1, and extracts the recording candidate RAW image group GIM2 based on the brightness of the RAW image.

Specifically, the recording candidate RAW image group extraction section 120 detects lightness of the RAW image and sets the time section including a brightly photographed RAW image to the second time section TP2. The lightless is an index value indicating brightness of an image, for example, an average luminance value of the entire image. Directly detecting brightness is to calculate the lightness from the RAW image. Indirectly detecting brightness is to calculate the lightness based on information other than the RAW image. For example, the lightness may be calculated based on the amount of illumination light of the endoscope system 5. This example also serves as an example of the system information of the second example configuration.

As a result, in some embodiments, it is possible to roughly extract the candidate RAW image according to the brightness of the RAW image before selecting the RAW image based on the importance. That is, it is possible to exclude the RAW image unsuitable for machine learning, such as too dark or too bright images, and record the other RAW image as a candidate.

In a third method, the recording candidate RAW image group extraction section 120 detects treatment operation of the endoscope system 5 and extracts the recording candidate RAW image group GIM2 based on the treatment operation of the endoscope system 5.

Specifically, the recording candidate RAW image group extraction section 120 detects a treatment tool from its appearance to disappearance in the RAW images, and sets the time section from appearance to disappearance thereof to the second time section TP2. The section from appearance to disappearance of the treatment tool is detected by image recognition processing. The image recognition processing includes, for example, contour detection of the treatment tool, detection of high-luminance regions, and detection of specific color regions.

As a result, in some embodiments, it is possible to roughly extract the candidate RAW image according to the treatment operation before selecting the RAW image based on the importance. That is, since it is highly probable that a learning target for machine learning is photographed in the time section in which the treatment operation is being performed, the recording target RAW image can be extracted by extracting the RAW image in the time section.

In a fourth method, the recording candidate RAW image group extraction section 120 detects movement of the insertion section 201 of the endoscope system 5, and extracts the recording candidate RAW image group GIM2 based on the movement of the insertion section 201. For example, the following first and second examples can be assumed.

In the first example, the recording candidate RAW image group extraction section 120 detects the section in which the distal end of the scope stands still, and sets the section to the second time section TP2. The stillness of the distal end of the scope is detected by performing motion detection on the RAW image. That is, if a degree of motion detected from the RAW image is a predetermined value or smaller, it is detected that the distal end of the scope stands still.

In the second example, the recording candidate RAW image group extraction section 120 detects an insertion/withdrawal direction of the insertion section 201 and sets the time section in which appropriate withdrawal is performed to the second time section TP2. The insertion/withdrawal direction is detected by performing motion detection on the RAW image. That is, if a motion converging to a vanishing point is detected from the RAW image, it is determined that the insertion section 201 is being withdrawn. Since examination of the large intestine or the like is performed during withdrawal, the RAW image in the time section in which withdrawal is performed is to be a recording candidate.

As a result, in some embodiments, it is possible to roughly extract the candidate RAW image according to a degree of motion of the insertion section 201 before selecting the RAW image based on the importance. That is, since it is highly probable that the learning target for machine learning is photographed during a specific motion of the insertion section 201, the recording target RAW image can be extracted by extracting the RAW image in the time section in which the insertion section 201 moves in the specific motion.

Next, a description will be given of a specific example of a method in which the RAW image recording importance determination section 140 selects the recording target RAW image. Any one of the following methods may be adopted, or two or more methods may be combined.

In a first method, the RAW image recording importance determination section 140 analyzes characteristics of a lesion in the RAW image, and sets the importance according to the characteristics of the lesion. The characteristics of the lesion is, for example, detected by image recognition processing such as AI processing. For example, the following first and second examples are assumed.

In the first example, the RAW image recording importance determination section 140 sets the importance according to a type of a lesion. For example, the RAW image recording importance determination section 140 sets the importance of the RAW image high when a rare case is detected.

In the second example, the RAW image recording importance determination section 140 analyzes size of a lesion and sets the importance according to the size. For example, when a small lesion to be easily missed is detected, the RAW image recording importance determination section 140 sets the importance of the RAW image high.

In a second method, the RAW image recording importance determination section 140 analyzes a treatment condition of the endoscope system 5 and sets the importance according to the treatment condition. The treatment condition is detected by image recognition processing. The image recognition processing includes, for example, contour detection of a treatment tool, detection of high luminance regions, and detection of specific color regions. Further, the treatment condition may be detected based on the system information from the endoscope system 5. For example, the treatment condition may be detected based on information of switch operation of an electric knife or the like. This example also serves as an example of the system information of the second example configuration. The following first and second examples are assumed as the example of the second method.

In the first example, the RAW image recording importance determination section 140 determines whether the RAW image was photographed before, during, or after the treatment, and sets the importance of the RAW image based on the determination result.

In the second example, the RAW image recording importance determination section 140 determines a type of a treatment tool captured in the RAW image, and sets the importance of the RAW image based on the type of the treatment tool.

In a third method, the RAW image recording importance determination section 140 determines whether the RAW image is an image of an already photographed site or not, and in a case where the RAW image is an image of a newly photographed site, sets the importance of the RAW image high. For example, a site captured in the RAW image is detected by image recognition processing such as AI processing and compared with the determination result of the already photographed image, thereby determining whether the site is already photographed or not.

Next, a description will be given of a specific example of a method in which the RAW image recording section 130 records the recording target RAW image.

The RAW image recording section 130 records the RAW image determined to be highly important, but does not record the other RAW image. Note that the RAW image not determined as highly important may be recorded as compressed data. The method thereof is described later.

4. Second Example Configuration

In the second example configuration, the recording candidate RAW image group extraction section 120 extracts the recording candidate RAW image group GIM2 based on the system information of the endoscope system 5. Note that the first and second example configurations can be combined. That is, the recording candidate RAW image group extraction section 120 may extract the recording candidate RAW image group GIM2 based on both of the analysis result of the RAW image and the analysis result of the system information.

Figure 6:
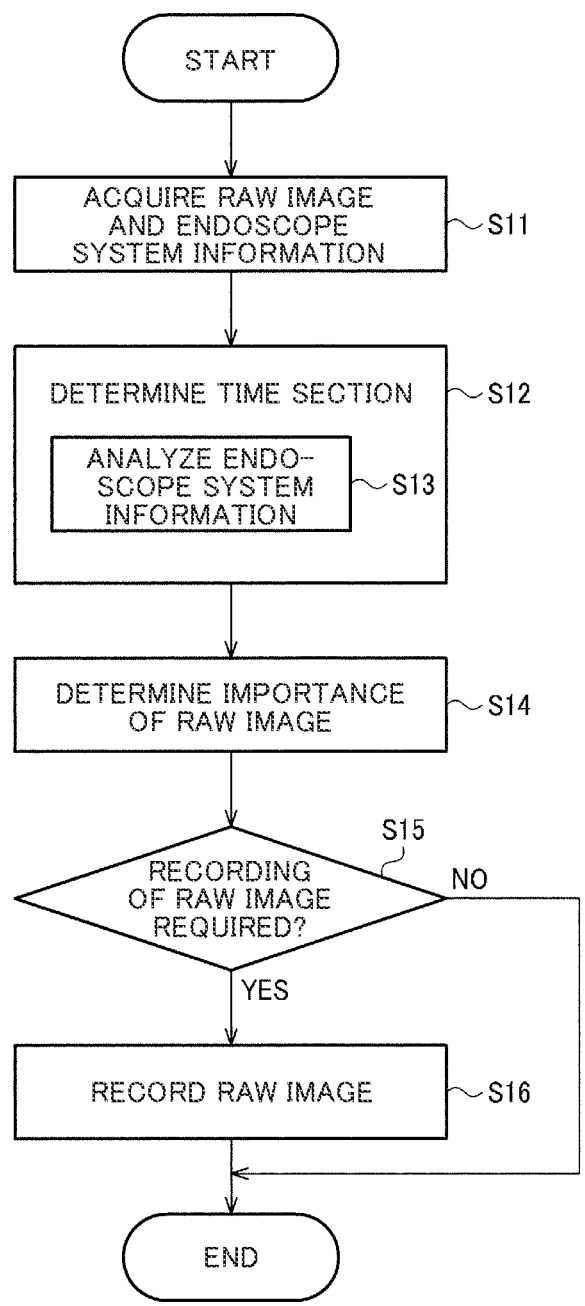
FIG. 6 is a flowchart illustrating processing performed by a processing section in a second example configuration.

The hardware configuration of the second example configuration is same as the one of the first example configuration illustrated in FIGS. 1 and 2. FIG. 6 is a flowchart illustrating processing performed by the processing section 100 in the second example configuration. Steps S14 to S16 are same as the steps S4 to S6 in the first example configuration illustrated in FIG. 4 and thus a description thereof is omitted.

In a step S11, the acquisition section 110 acquires the RAW images and the system information of the endoscope system. Specifically, the acquisition section 110 is a data interface of the processing section 100, receiving the time series RAW image group GIM1 and the system information transferred from the endoscope system 5, temporarily storing the time series RAW image group GIM1 in the storage section 200, and outputting the system information to the recording candidate RAW image group extraction section 120. The system information is information about control, operation, or a state of the endoscope system 5, and transmitted as signals or data. The system information is, for example, time series information, likewise the RAW images. The system information at the time of photographing each RAW image is associated with the RAW image and input to the acquisition section 110.

In a step S12, the recording candidate RAW image group extraction section 120 determines the second time section TP2. Specifically, the recording candidate RAW image group extraction section 120 analyzes the system information of the endoscope system 5 at the time of photographing the time series RAW image group GIM1 in a step S13; determines the second time section TP2 based on the analysis result in the step S12; and extracts the recording candidate RAW image group GIM2. The specific example of the system information is described later.

As a result, in some embodiments, it is possible to roughly extract the candidate RAW image based on the system information of the endoscope system 5 before selecting the RAW image based on the importance. That is, since it is highly probable that the learning target for machine learning is photographed by specific control, operation, or a state of the endoscope system 5, it is possible to extracts the recording target RAW image by extracting the RAW image in the time section in which the specific control, operation or state of the endoscope system is performed.

A description will be given of a specific example of a method in which the recording candidate RAW image group extraction section 120 extracts the recording candidate RAW image group GIM2. Any one of the following methods may be adopted, or two or more methods may be combined.

In a first method, the recording candidate RAW image group extraction section 120 detects a type of a light source at the time when the time series RAW image group GIM1 was photographed, and sets a time section photographed by a desired type of the light source to the second time section TP2. The type of the light source is a spectral-based type such as white light and special light, or a type of a light emitting element such as a xenon lump, LED, or a laser diode. The system information indicating the type of the light source includes, for example, a control signal of an illumination light mode.

In a second method, the recording candidate RAW image group extraction section 120 detects imaging magnification of the scope and set the time section photographed at the desired magnification to the second time section TP2. The system information indicating the imaging magnification includes, for example, a control signal for zoom operation.

In a third method, the recording candidate RAW image group extraction section 120 detects release operation or freeze operation, and sets the time section including before and after the timing when the release operation or the freeze operation is performed to the second time section TP2. The release operation or the freeze operation is, for example, performed by a button provided in the grip section 204 shown in FIG. 1, and a signal of the button operation corresponds to the system information.

In a fourth method, a user provides input to the endoscope system 5, the input indicating determination that the RAW image should be recorded, and the recording candidate RAW image group extraction section 120 sets the second time section TP2 based on the input information. The input mentioned above is, for example, provided through an operation section provided in the grip section 204, the control device 3 or the monitor 4 in FIG. 1, or provided by voice input or the like.

5. Third Example Configuration

Figure 7:
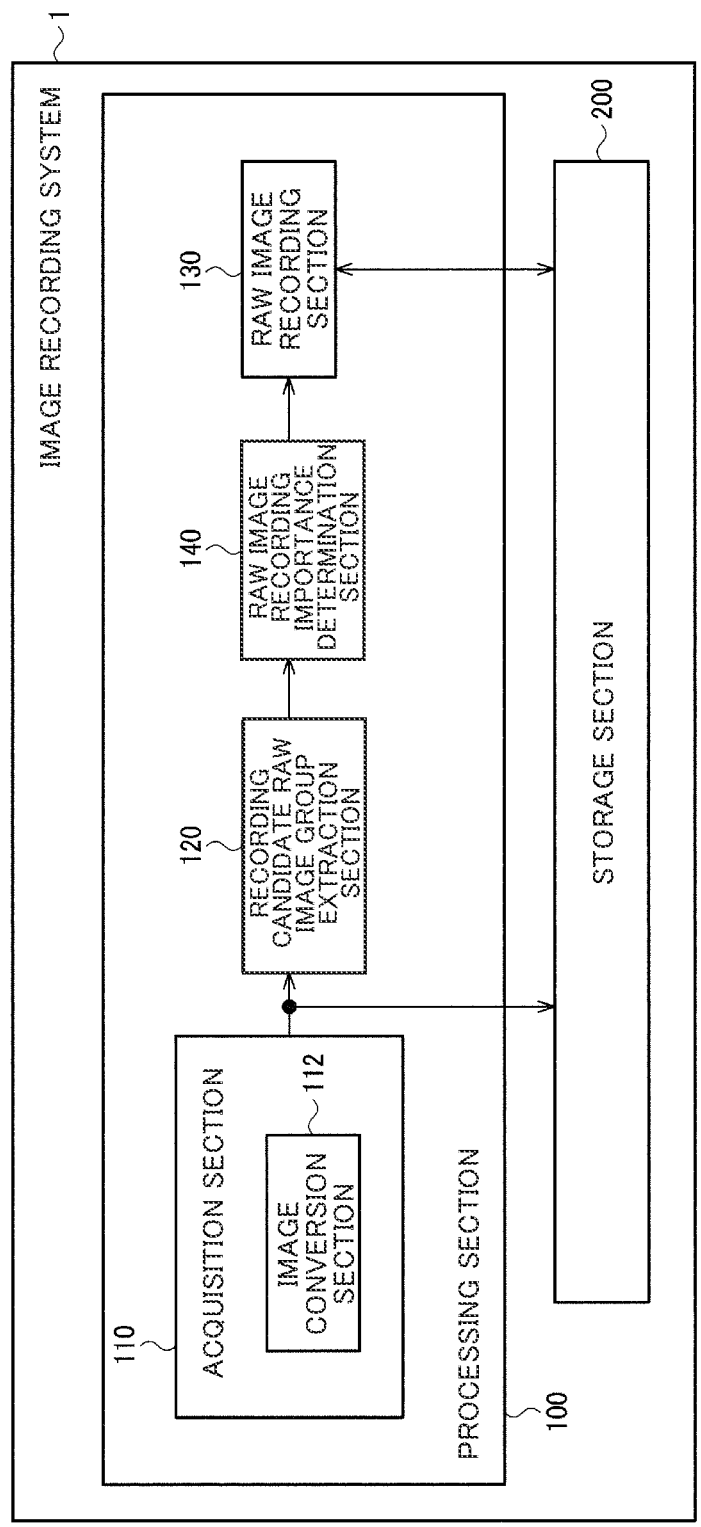
FIG. 7 illustrates a third example configuration of the image recording system.

FIG. 7 is a third example configuration of the image recording system 1. In FIG. 7, the acquisition section 110 includes an image conversion section 112. Note that a description of a component described with regard to the first and second example configurations is omitted as appropriate.

The image conversion section 112 performs conversion processing on the RAW image included in the time series RAW image group GIM1, and generates a converted image. The recording candidate RAW image group extraction section 120 extracts the recording candidate RAW image group GIM2 based on the converted image.

The conversion processing is a process of converting the RAW image to a color image, that is development processing. The conversion processing may also include white balance processing, noise processing, tone conversion processing, color conversion processing, enhancement processing, or the like.

As a result, in some embodiments, it is possible to convert the RAW image to an image suitable for extraction processing of the recording candidate RAW image group GIM2, and then extract the recording candidate RAW image group GIM2 based on the converted image.

6. Fourth Example Configuration

Figure 8:
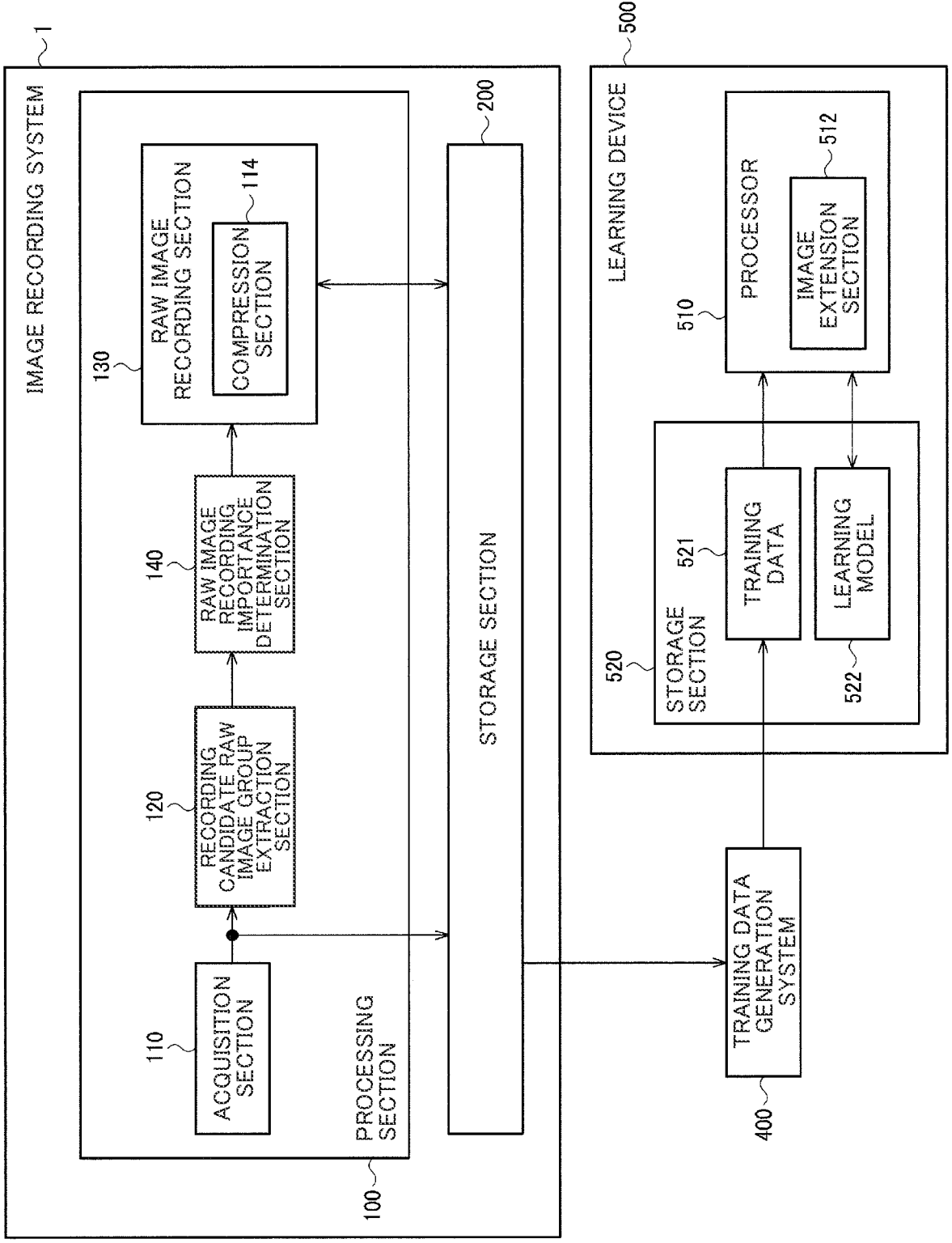
FIG. 8 illustrates a fourth example configuration of the image recording system.

In a fourth example configuration, the RAW image that is not selected as the recording target is recorded as compressed data. FIG. 8 illustrates the fourth example configuration of the image recording system 1. In FIG. 8, the RAW image recording section 130 includes a compression section 114. Further, the processor 510 of the learning device 500 includes an image extension section 512. Note that a description of a component described with regard to the first and second example configurations is omitted as appropriate.

Figure 9:
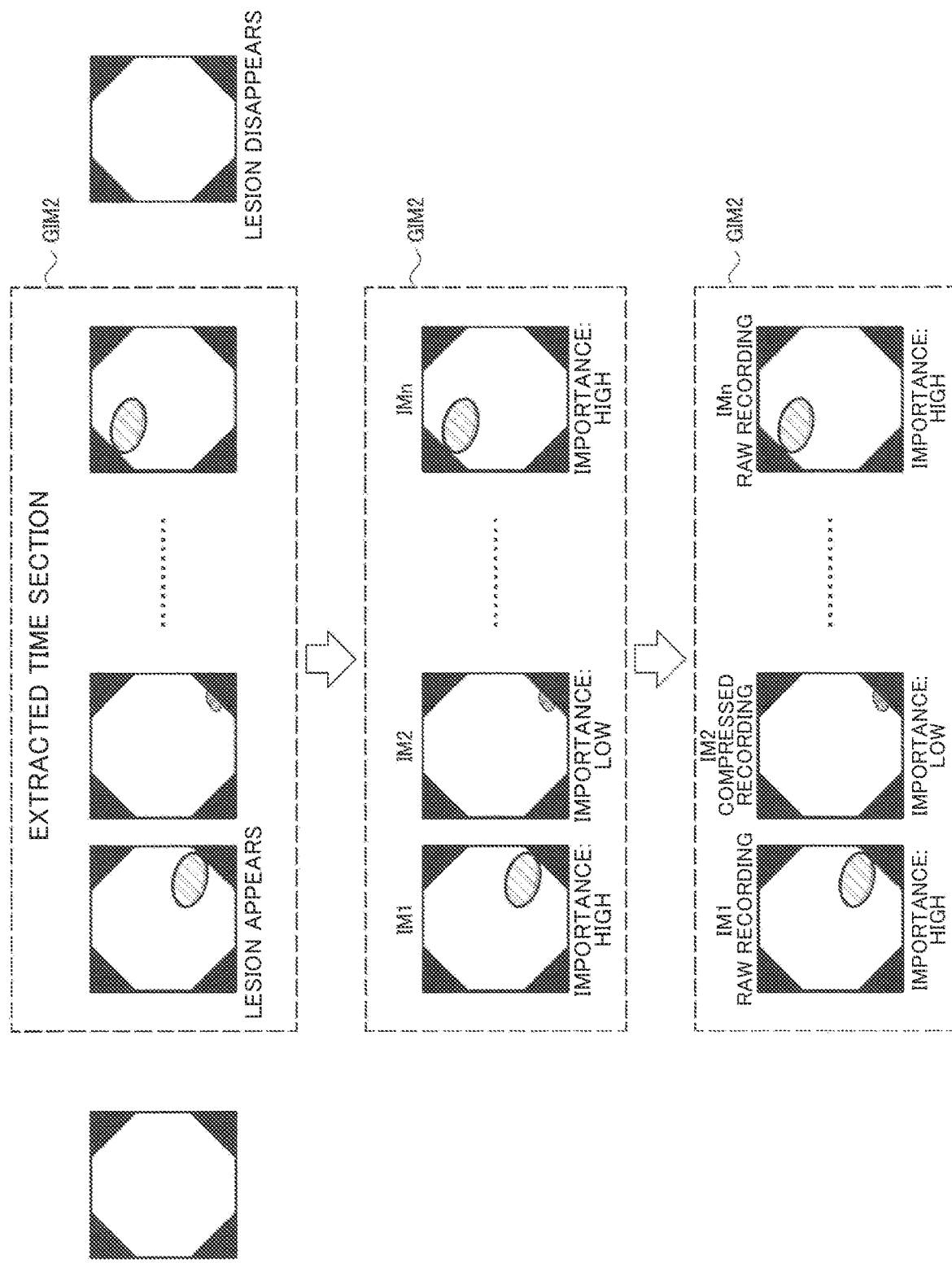
FIG. 9 is a diagram illustrating processing performed by a processing section in the fourth example configuration.

As shown in FIG. 9, the compression section 114 converts the RAW image among the recording candidate RAW image group GIM2, which is not selected by the RAW image recording importance determination section 140, to compressed data. That is, the RAW image that is determined to be of "low" importance by the RAW image recording importance determination section 140 is converted to the compressed data. The RAW image recording section 130 records the compressed data and the RAW image selected by the RAW image recording importance determination section 140 in the storage section 200. FIG. 9 illustrates an example where IM1, IMn, etc. are recorded in a RAW format, and IM2, etc. are recorded in a compressed format.

Note that the compression section 114 may convert the RAW image among the time series RAW image group GIM1, which is not selected by the RAW image recording importance determination section 140, to compressed data, and then the RAW image recording section 130 records the compressed data in the storage section 200. That is, the compression section 114 converts not only the RAW image among the recording candidate RAW image group GIM2, which is not selected by the RAW image recording importance determination section 140, but also the RAW image not extracted as the recording candidate RAW image group GIM2 to the compressed data.

The compressed data is data of the RAW image that has been subjected to development processing or compression processing, and corresponds to compressed data of the color image. The data amount of the compressed data generated by one RAW image is smaller than the data amount of the original one RAW image.

As a result, in some embodiments, the RAW image with high importance as well as the compressed data of the other compressed RAW image are recorded. This enables machine learning using the RAW images and the compressed data. Machine learning requires a lot of images; hence, by adding the compressed data to secure a lot of images as well as using the RAW images for a part of those images, highly accurate learning becomes possible.

The recording target RAW image is an image to be used in machine learning after being converted to an extended image by image processing. The recording target RAW image is highly flexible for image processing, and thus easily converted to the desired extended image. The compressed data is an image to be used in machine learning without being converted to the extended image. That is, the image extension section 512 of the learning device 500 converts the recording target RAW image to the extended image by image extension processing. The image extension section 512 does not perform image extension processing on the compressed data. The image extension processing includes development processing, white balance processing, noise processing, tone conversion processing, color conversion processing, enhancement processing, or the like. The processor 510 performs machine learning for the learning model 522 using the extended image and the compressed data as the image for learning.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. A system comprising:
an image recording system comprising:
a processor comprising hardware, the processor being configured to:
extract, from a time series RAW image group including a plurality of time series RAW images in a first time section, a recording candidate RAW image group included in a second time section as a part of the first time section;
select a recording target RAW image from the recording candidate RAW image group;
record the recording target RAW image;
convert a first RAW image to first compressed data, the first RAW image being an image from the time series RAW image group that is not extracted as the recording candidate RAW image group;
convert a second RAW image to a second compressed data, the second RAW image being an image from the recording candidate RAW image group that is not selected as the recording target RAW image; and
record the first compressed data and the second compressed data;
a training data generation system comprising a second processor comprising hardware, the second processor being configured to:
develop the recording target RAW image that is recorded to generate a display image;
control a display to display the display image;
acquire a training label through user input corresponding to the display image;
associate the training label with the recording target RAW image to generate a training image; and
record the training image; and
a learning device comprising a third processor comprising hardware, wherein the third processor is configured to perform machine learning for a learning model using the training image.

2. The system as defined in claim 1,
wherein processing time for the processor to select one RAW image as the recording target RAW image from the recording candidate RAW image group is longer than processing time for the processor to extract one RAW image in the recording candidate RAW image group from the time series RAW image group.

3. The system as defined in claim 1,
wherein the processor is configured to determine each RAW image of the recoding candidate RAW image group based on importance to select the recording target RAW image.

4. The system as defined in claim 1,
wherein the processor is configured to:
convert the plurality of times series RAW images included in the time series RAW image group to generate a plurality of converted images; and
extract the recording candidate RAW image group based on the plurality of converted images.

5. The system as defined in claim 1,
wherein the processor is configured to:
detect a state of an image capturing target in a time series RAW image included in the time series RAW image group; and
extract the recording candidate RAW image group based on the state of the image capturing target.

6. The system as defined in claim 1,
wherein the processor is configured to:
detect directly or indirectly brightness of a time series RAW image included in the time series RAW image group; and
extract the recording candidate RAW image group based on the brightness of the time series RAW image.

7. The system as defined in claim 1,
wherein the processor is configured to acquire, as the plurality of time series RAW images, a plurality of medical images photographed in time series by an endoscope system.

8. The system as defined in claim 1,
wherein the processor is configured to:
acquire the time series RAW image group captured by an endoscope system; and
detect a treatment operation performed by of the endoscope system and extract the recording candidate RAW image group based on the treatment operation detected.

9. The system as defined in claim 1,
wherein the processor is configured to:
acquire the time series RAW image group captured by an endoscope system; and
detect movement of an insertion section of the endoscope system and extract the recording candidate RAW image group based on the movement of the insertion section detected.

10. The system as defined in claim 1,
wherein the processor is configured to:
acquire the time series RAW image group captured by an endoscope system and system information of the endoscope system; and
extract the recording candidate RAW image group based on the system information.

11. The system as defined in claim 1,
wherein the processor is configured to:
set an importance to at least one image of the recording candidate RAW image group, wherein the importance is determined based on at least one of a type of a lesion, a characteristic of the lesion, a movement of a treatment tool and a type of the treatment tool; and select the recording target RAW image from the recording candidate RAW image group based on the importance set to the at least one image of the recording candidate RAW image group.

12. An image recording method comprising:

extracting, from a time series RAW image group including a plurality of time series RAW images in a first time section, a recording candidate RAW image group included in a second time section as a part of the first time section;

selecting a recording target RAW image from the recording candidate RAW image group;

recording the recoding target RAW image;

converting a first RAW image to first compressed data, the first RAW image being an image from the time series RAW image group that is not extracted as the recording candidate RAW image group;

converting a second RAW image to a second compressed data, the second RAW image being an image from the recording candidate RAW image group that is not selected as the recording target RAW image; and recording the first compressed data and the second compressed data, wherein the image recording method further comprises:

converting the recording target RAW image that is recorded to an extended image by image extension processing;

perform machine learning using the extended image; and perform the machine learning using the first RAW image and the second RAW image without converting the first RAW image and the second RAW image to the extended image.

13. The image recording method as defined in claim 12, further comprising:

developing the recording target RAW image that is recorded to generate a display image;

controlling a display to display the display image;

acquiring a training label through user input corresponding to the display image;

associating the training label with the recording target RAW image to generate a training image;

recording the training image; and performing machine learning for a learning model using the training image.

* * * * *